United States Patent
Bauman et al.

(10) Patent No.: US 10,150,254 B2
(45) Date of Patent: Dec. 11, 2018

(54) APPARATUS AND METHOD FOR THE SEPARATION OF A FOIL FROM A MATERIAL LAYER

(75) Inventors: Brian Bauman, Liberty Hill, TX (US); Richard Thomas, Sleepy Hollow, IL (US)

(73) Assignee: DSM IP ASSETS, B.V., Heerlen (NL)

( * ) Notice: Subject to any disclaimer, the term of this patent is extended or adjusted under 35 U.S.C. 154(b) by 1250 days.

(21) Appl. No.: 14/127,814

(22) PCT Filed: Jun. 22, 2012

(86) PCT No.: PCT/US2012/043823
§ 371 (c)(1),
(2), (4) Date: Apr. 22, 2014

(87) PCT Pub. No.: WO2012/178067
PCT Pub. Date: Dec. 27, 2012

(65) Prior Publication Data
US 2014/0246813 A1 Sep. 4, 2014

Related U.S. Application Data

(60) Provisional application No. 61/500,064, filed on Jun. 22, 2011.

(51) Int. Cl.
*B29C 67/00* (2017.01)
*B33Y 30/00* (2015.01)
(Continued)

(52) U.S. Cl.
CPC ............ *B29C 67/007* (2013.01); *B29C 64/00* (2017.08); *B29C 64/129* (2017.08);
(Continued)

(58) Field of Classification Search
CPC ... B29C 64/129; B29C 64/223; B29C 64/232; B29C 64/176; B29C 64/00; B33Y 30/00
See application file for complete search history.

(56) References Cited

U.S. PATENT DOCUMENTS

| 3,248,031 A * | 4/1966 | Kilmartin .......... B65H 23/0258 226/194 |
| 5,192,559 A | 3/1993 | Hull et al. |
| 2011/0089610 A1 | 4/2011 | El-Siblani et al. |

FOREIGN PATENT DOCUMENTS

| EP | 1253002 A1 | 10/2002 |
| EP | 1732746 A1 | 12/2006 |

(Continued)

OTHER PUBLICATIONS

International Search Report and Written Opinion dated Feb. 6, 2013 (PCT/US2012/043823); ISA/EP.

*Primary Examiner* — Yogendra N Gupta
*Assistant Examiner* — Ninh Le
(74) *Attorney, Agent, or Firm* — Daniel S. Bujas

(57) ABSTRACT

An apparatus and method for additive fabrication which helps to prevent the newly hardened layer from being separated from the previously formed layer of the object while the foil is peeled from the newly hardened layer is provided. In one embodiment, use of a peel angle helps prevent the newly hardened layer from being separated from the previously formed layer during peeling by distributing the peeling force so that less of the z-direction component of the peeling force is applied to the newly hardened layer. In another embodiment, the object can be oriented to initiate the peel at an area, of the object which results in a lesser initial peeling force applied to the newly hardened layer.

20 Claims, 12 Drawing Sheets

(51) Int. Cl.
*B29C 64/223* (2017.01)
*B29C 64/176* (2017.01)
*B29C 64/00* (2017.01)
*B29C 64/232* (2017.01)
*B29C 64/129* (2017.01)

(52) U.S. Cl.
CPC .......... *B29C 64/176* (2017.08); *B29C 64/223* (2017.08); *B29C 64/232* (2017.08); *B33Y 30/00* (2014.12)

(56) References Cited

FOREIGN PATENT DOCUMENTS

EP 2011631 A1 1/2009
EP 2199067 A1 6/2010
WO WO2010/074566 A1 * 7/2010

* cited by examiner

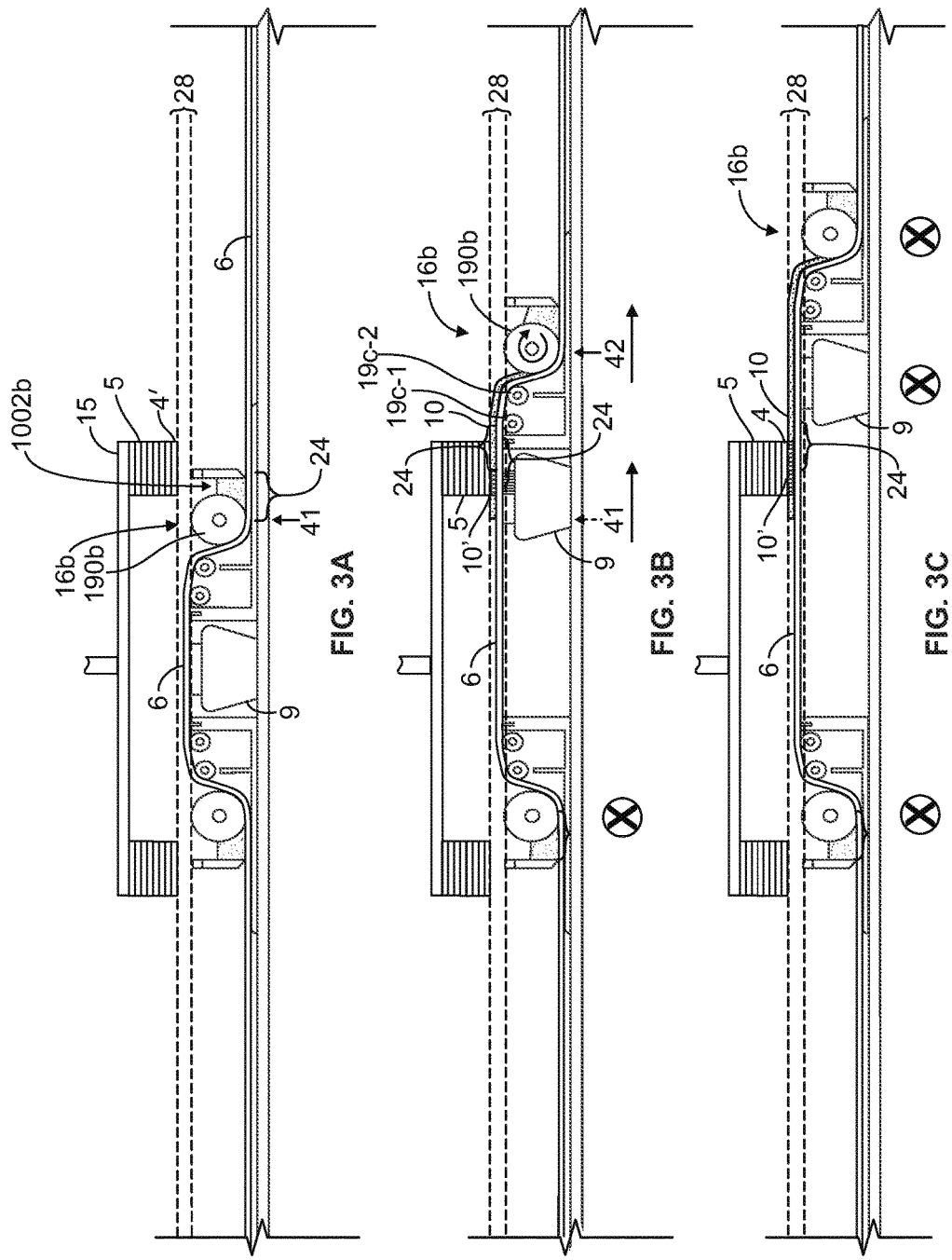

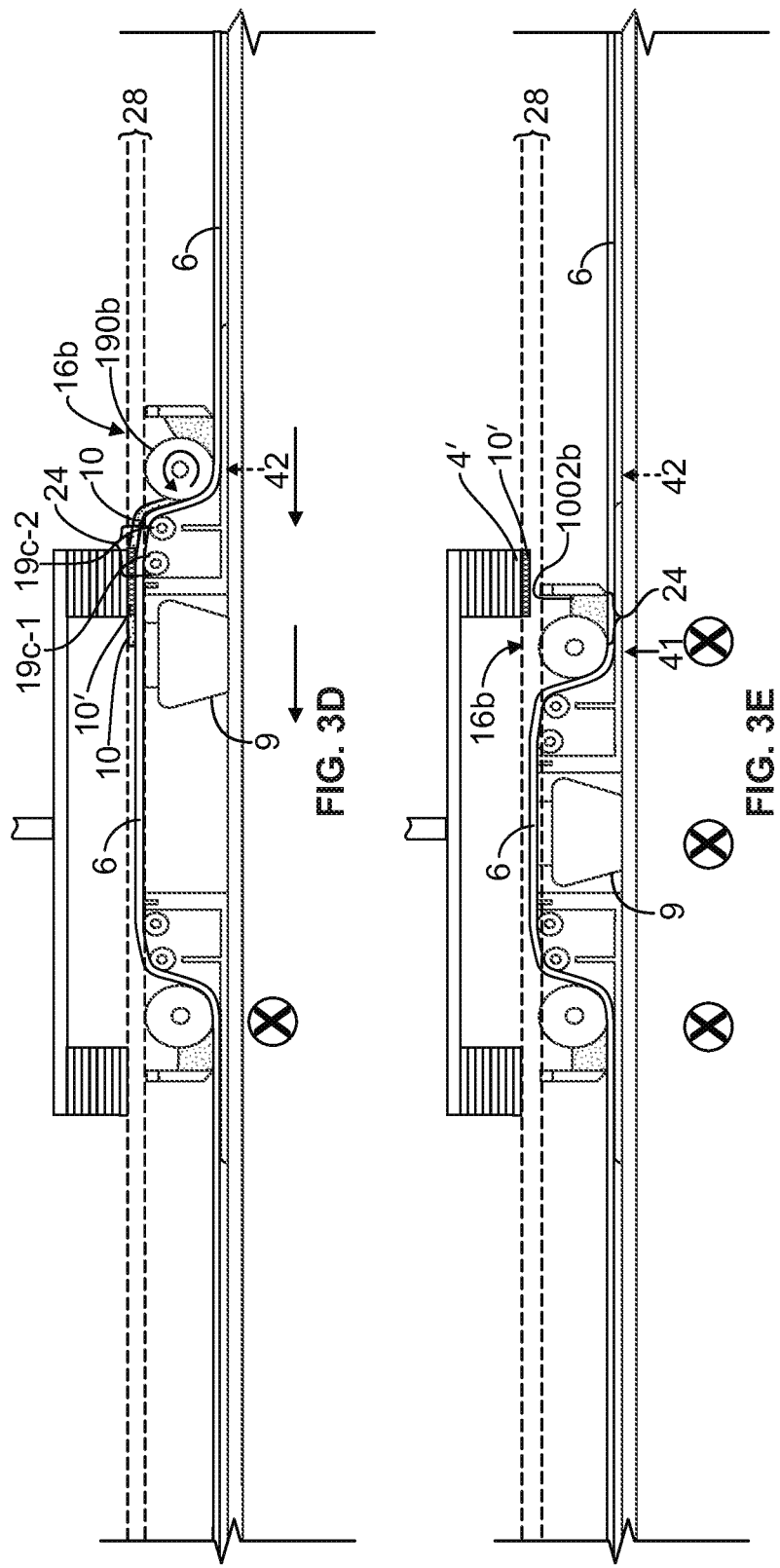

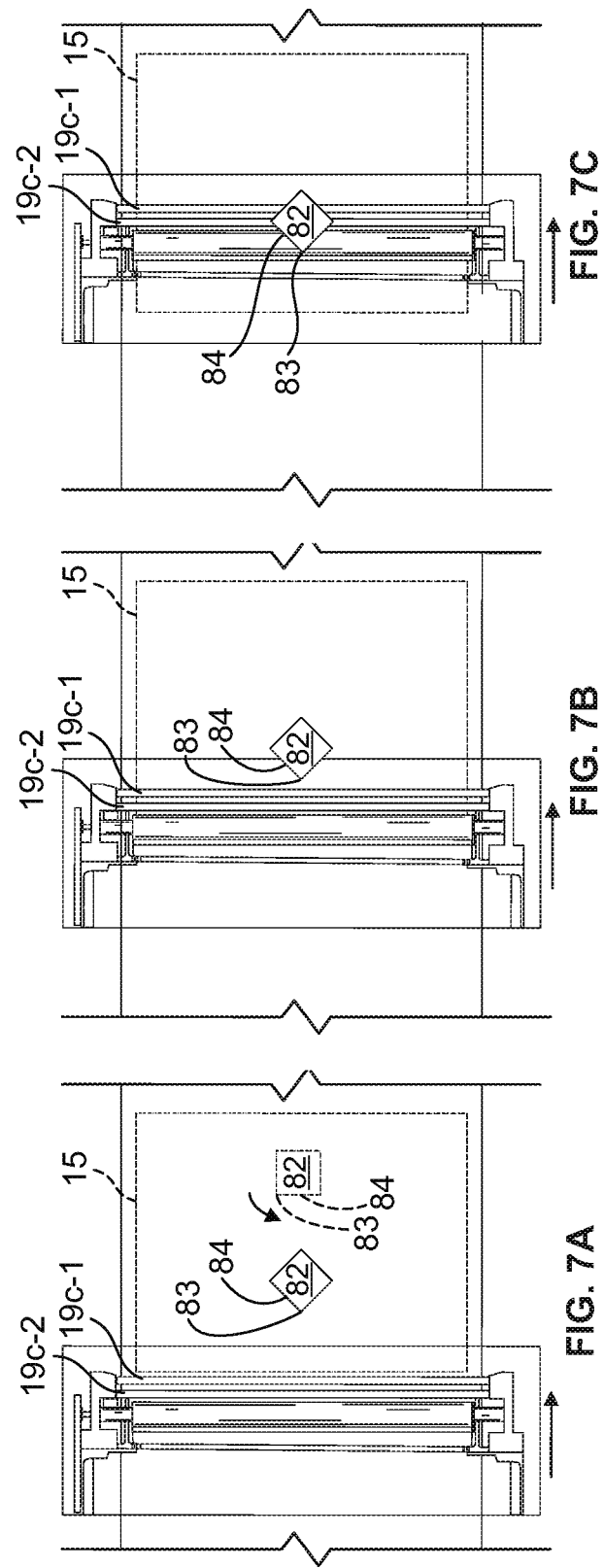

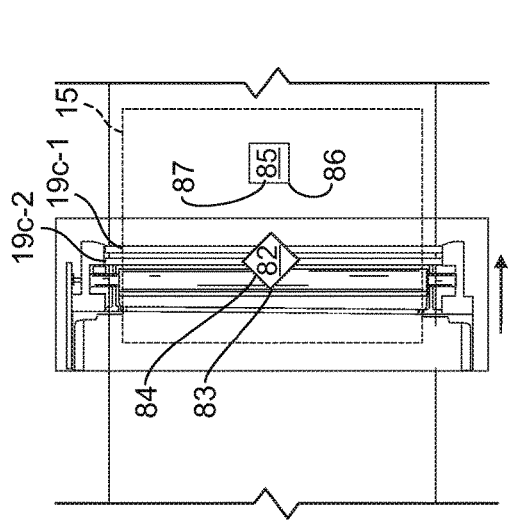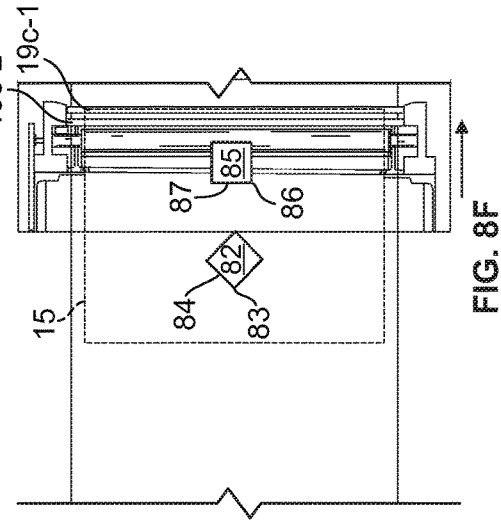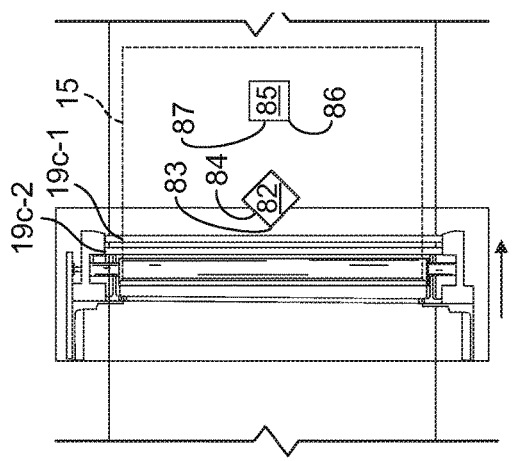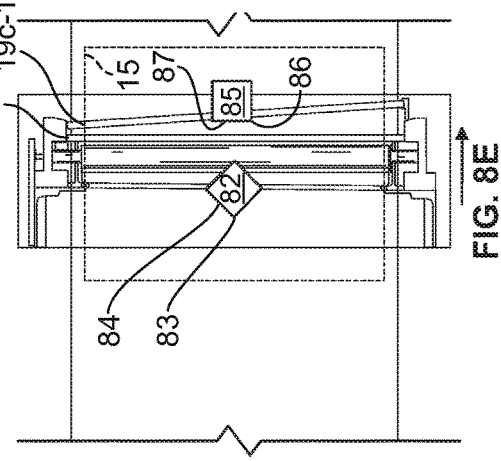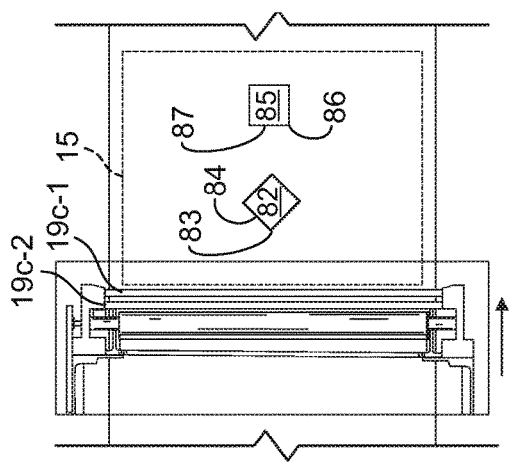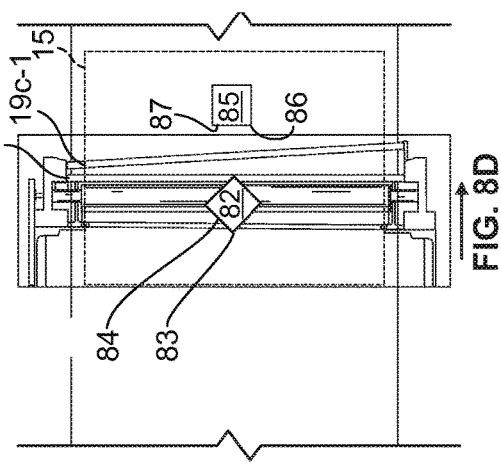

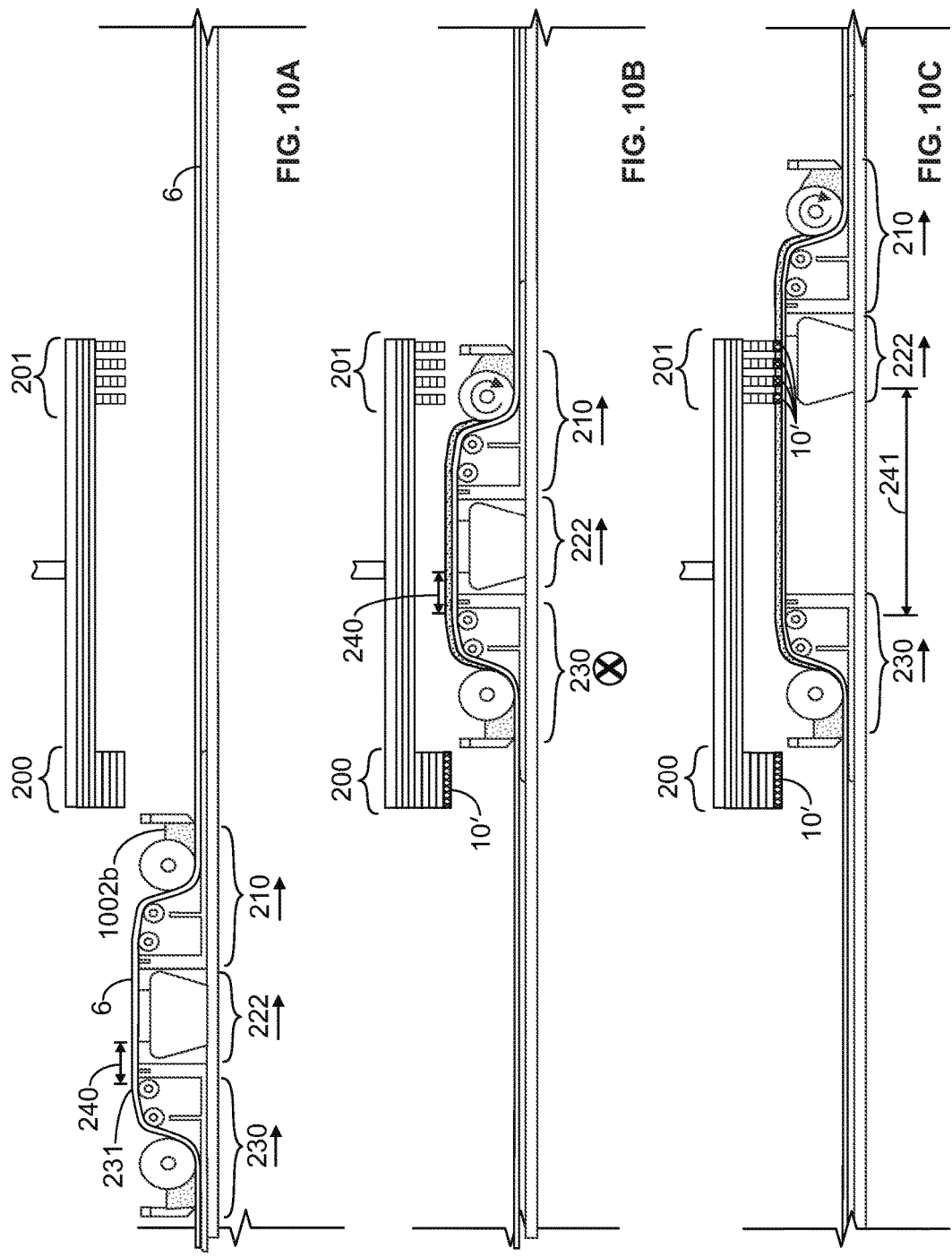

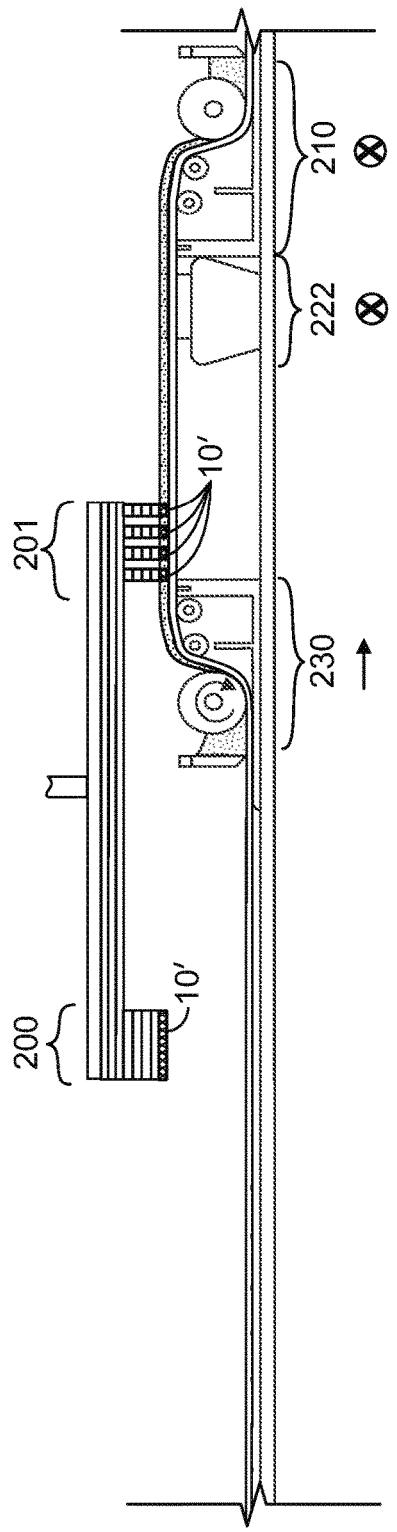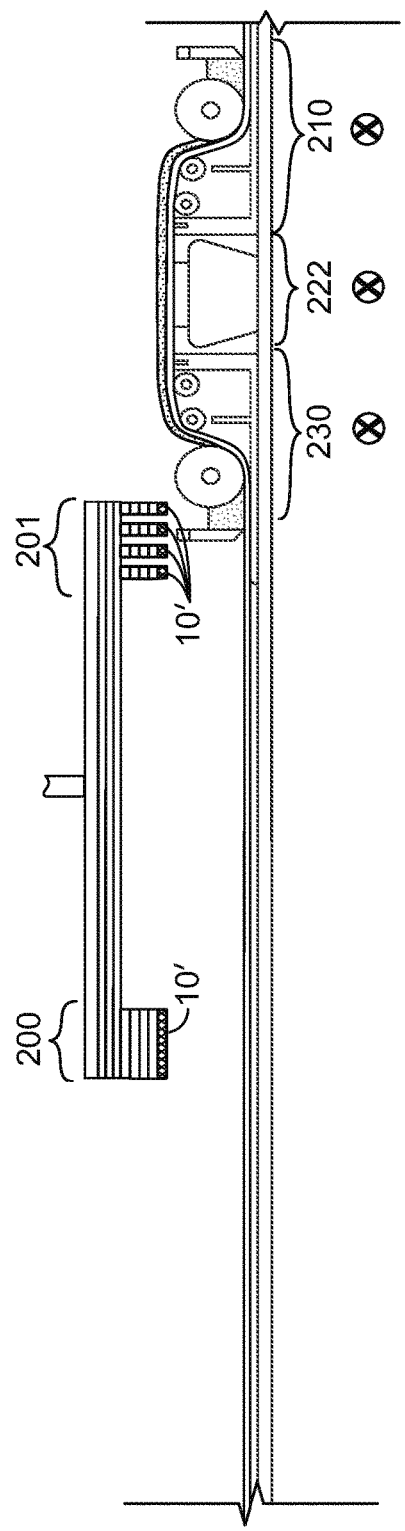

APPARATUS AND METHOD FOR THE SEPARATION OF A FOIL FROM A MATERIAL LAYER

CROSS-REFERENCE TO RELATED APPLICATIONS

This application claims priority to U.S. Provisional Application No. 61/500,064, filed on Jun. 22, 2011, which is incorporated herein in its entirety.

FIELD AND BACKGROUND OF THE INVENTION

In additive fabrication processes with high imaging resolution, an object can be built layer-by-layer by use of a foil to transport a layer of build material and position the layer in contact with a previously formed layer of an object in an object building area where the layer is hardened by radiation from an exposure unit to form the newly hardened layer of the object. The object is held by an object carrier. The previously formed layer may not be completely hardened when the newly hardened layer is formed. Prior to forming the subsequent layer, the foil can be separated from the newly hardened layer by peeling the foil from the newly hardened layer of the object. The force applied to peel the foil from the newly hardened layer must be large enough to overcome the adhesive force between the foil and the newly hardened layer. However, it is critical that the newly hardened layer is not separated from the previously formed layer during the peeling process.

Additive fabrication processes that utilize a foil to transport build material to an object build area and peel the foil from the newly hardened layer are known. For example, U.S. Pat. No. 6,547,552 to Fudim (the '552 patent) uses a roller assembly and foil to contact a layer of build material to a previously formed layer of an object. An exposure unit exposes the layer to radiation to harden the layer and adhere the hardened layer to the previously formed layer of the object. The roller assembly moves back toward to its original position to peel the foil from the newly hardened layer of the object. This process is repeated to create subsequent layers of the object until the object is completed. Similarly, U.S. Pat. No. 7,731,887 to Hull et al. (the '887 patent) discloses foil based additive fabrication process where a roller is used to peel foil from a newly hardened layer of an object.

EP2011631A1 to Envisiontec GmbH discloses the sensing of certain build conditions in order to affect several process parameters in a system wherein a foil is in contact with build material contained in a vat. The disclosed process parameters that may be affected include tilting of the object carrier and/or the foil in order to create an angle between the newly hardened layer of an object and the building plane. The creation of this angle allegedly has the effect of enhancing or adjusting separation forces. However, this method is cumbersome and requires displacement of the entire object carrier or entire foil. Moreover, since the build material useful in such processes is often highly flowable, tilting of the entire foil may cause spills, undesirable buildup of build material in some areas, or increase in the time of equilibration of the build material in the vat.

U.S. Pat. No. 7,614,866 to 3D Systems discloses a method of foil-based additive fabrication. The cured resin is separated from the foil primarily by a shearing action, but the elevator platform can be titled to facilitate removal.

An apparatus and method for additive fabrication which prevents the newly hardened layer from being separated from the previously formed layer of the object while the foil is peeled from the newly hardened layer by controlling or reducing the separation forces is thus desirable.

SUMMARY OF THE INVENTION

In one embodiment, an additive fabrication apparatus may comprise:
(1) a plate for holding an object; a foil;
(2) an applicator arranged for applying a layer of build material to the foil;
(3) a source of radiation capable of delivering radiation to a build area, whereby radiation delivered to the layer of build material positioned in the build area forms a newly hardened layer of the object; and
(4) a separator arranged to separate the foil and the newly hardened layer, comprising a foil orientation adjustment device arranged to adjust the orientation between the foil and the plate;
wherein the foil orientation adjustment device is engaged such that the foil is positioned substantially parallel to the plate at a first position in the build area and positioned at an orientation away from the plate at a second position in the build area.

In an embodiment, a method for additive fabrication may comprise determining a peel angle via a pre-build assessment of the object to be formed and then building the object from a plurality of individual layers utilizing the peel angle. In an embodiment, the peel angle is altered at least once during the building of the object. In an embodiment, the peel angle is altered at least once during the building of at least one of the individual layers.

In an embodiment, a method for additive fabrication may comprise determining an object orientation via a pre-build assessment of the object to be formed and then building the object utilizing the determined object orientation. In an embodiment, the object orientation is altered at least once during the building of the object. In an embodiment, the object orientation is altered at least once during the building of at least one of the individual layers.

In an embodiment, a method for additive fabrication may comprise determining a separation time from a pre-build assessment of the object to be formed and then building the object utilizing the separation time. In an embodiment, the separation time is altered at least once during the building of the object. In an embodiment, the separation time is altered at least once during the building of at least one of the individual layers.

In one embodiment, a method for additive fabrication where a foil is peeled from a newly hardened layer of build material may comprise the steps of performing a pre-build assessment of an object comprising determining an object orientation that will result in a peeling force applied to a newly hardened layer of the object during the building of the object that will result in an improved peeling force over alternative object orientations, and building the object, the object being positioned at the object orientation, from a plurality of individual layers formed by performing the steps of coating a build material onto a foil and irradiating the build material.

In an embodiment, an additive fabrication apparatus may comprise:
(1) a plate for holding an object;
(2) a foil;

(3) an applicator arranged for applying a layer of build material to the foil;
(4) a source of radiation capable of delivering radiation to a build area, whereby radiation delivered to the layer of build material positioned in the build area forms a newly hardened layer of the object;
(5) a separator arranged to separate the foil and the newly hardened layer; and
(6) an object orientation adjustment controller;

wherein the object orientation adjustment controller is arranged to adjust the in-plane orientation between an object and the separator.

In another embodiment, a method for additive fabrication where a foil is peeled from a newly hardened layer of build material may comprise performing a pre-build assessment of an object to determine what orientation will result in a lesser initial peeling force applied to a newly hardened layer of the object during the build, and building the object at the orientation determined during the pre-build assessment. The method may further comprise determining a certain parameter during the pre-build assessment, such as an average initial peeling force across all layers or a maximum peeling force for each layer, and building the object in the orientation which results in a value of the parameter throughout the building of the object that is determined to improve the certain parameter over alternative building orientations.

In an embodiment, an additive fabrication apparatus may comprise:
(1) a plate for holding an object;
(2) a foil;
(3) an applicator arranged for applying a layer of build material to the foil;
(4) a source of radiation capable of delivering radiation to a build area, whereby radiation delivered to the layer of build material positioned in the build area forms a newly hardened layer of the object;
(5) a separator arranged to separate the foil and the newly hardened layer; and
(6) a separation time controller;

wherein the separation time controller is arranged to adjust a separation time, the separation time being the time interval from the formation of at least a portion of the newly hardened layer to the separating of the foil from the portion of the newly hardened layer; wherein the separation time is adjusted based at least in part on i) one or more characteristics of the previously formed layers of the object or layers of the object to be subsequently formed, or ii) at least a plurality of regions of the newly hardened layer such that a first region of the newly hardened layer has a separation time which is different than that of a second region of the newly hardened layer, or iii) both.

In an embodiment, a method for additive fabrication where a foil is peeled from a newly hardened layer of build material to build an object from a plurality of individual layers may comprise performing a pre-build assessment of each individual layer of the object to be built and adjusting the peel angle, object orientation, and/or separation time based at least in part on i) characteristics of the previously formed layers of the object or layers of the object to be subsequently formed, or ii) at least a plurality of regions of the newly hardened layer such that a first region of the newly hardened layer has a separation time which is different than that of a second region of the newly hardened layer, or iii) both.

BRIEF DESCRIPTION OF THE DRAWINGS

Further details, aspects, and embodiments of the invention will be described, by way of example only, with reference to the drawings.

FIGS. 3A through 3E are cross sectional views depicting various states of an embodiment of the additive fabrication system during operation;

FIGS. 7A through 7C are top views depicting various states of an embodiment of the current invention during operation;

FIGS. 8A through 8F are top views depicting various states of an embodiment of the current invention during operation;

FIGS. 10A through 10E are cross sectional views depicting various states of an embodiment of the current invention during operation;

DETAILED DESCRIPTION

Figure 1:
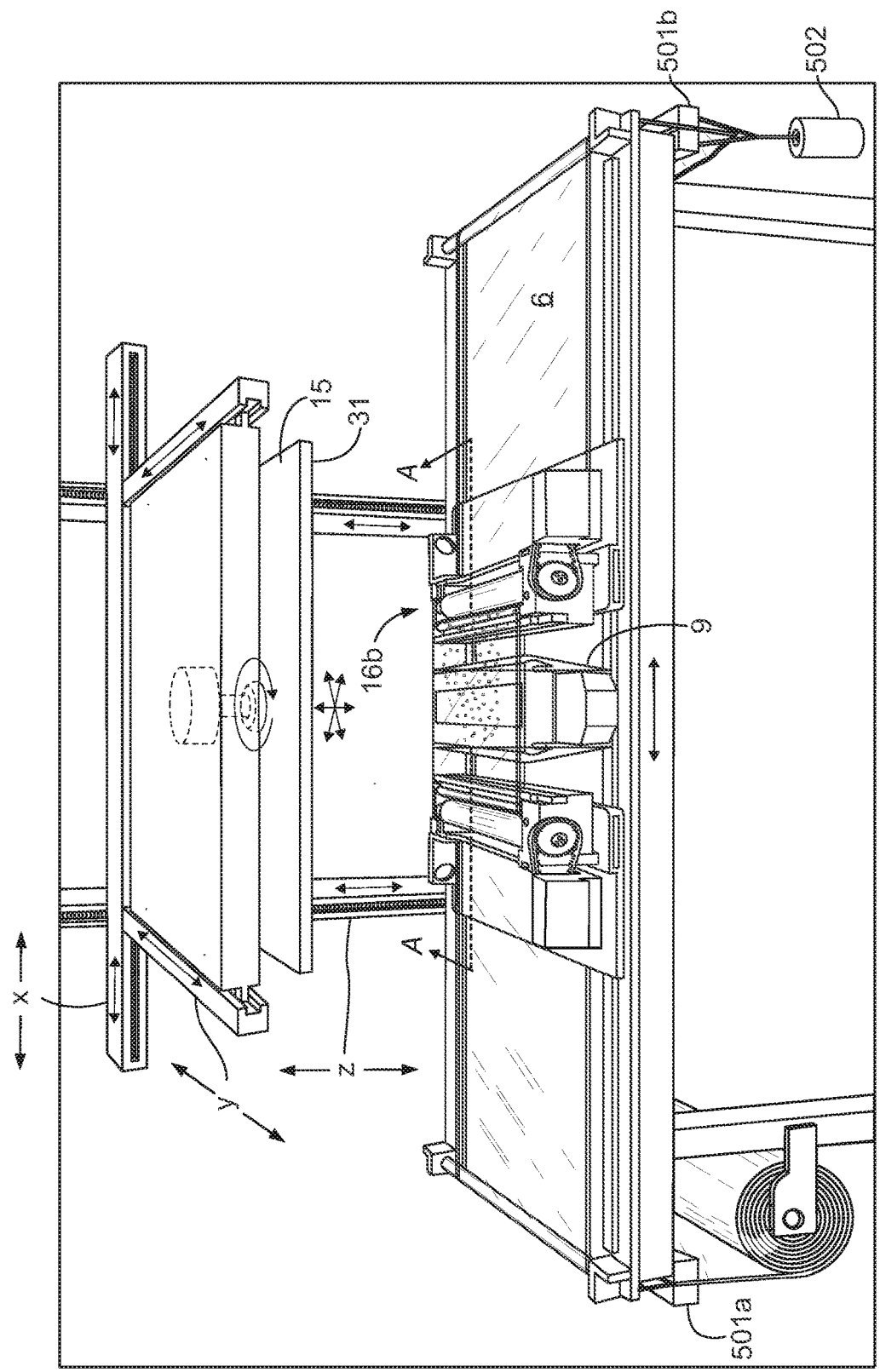
FIG. 1 is a top perspective view of an embodiment of an additive fabrication system.
Figure 2:
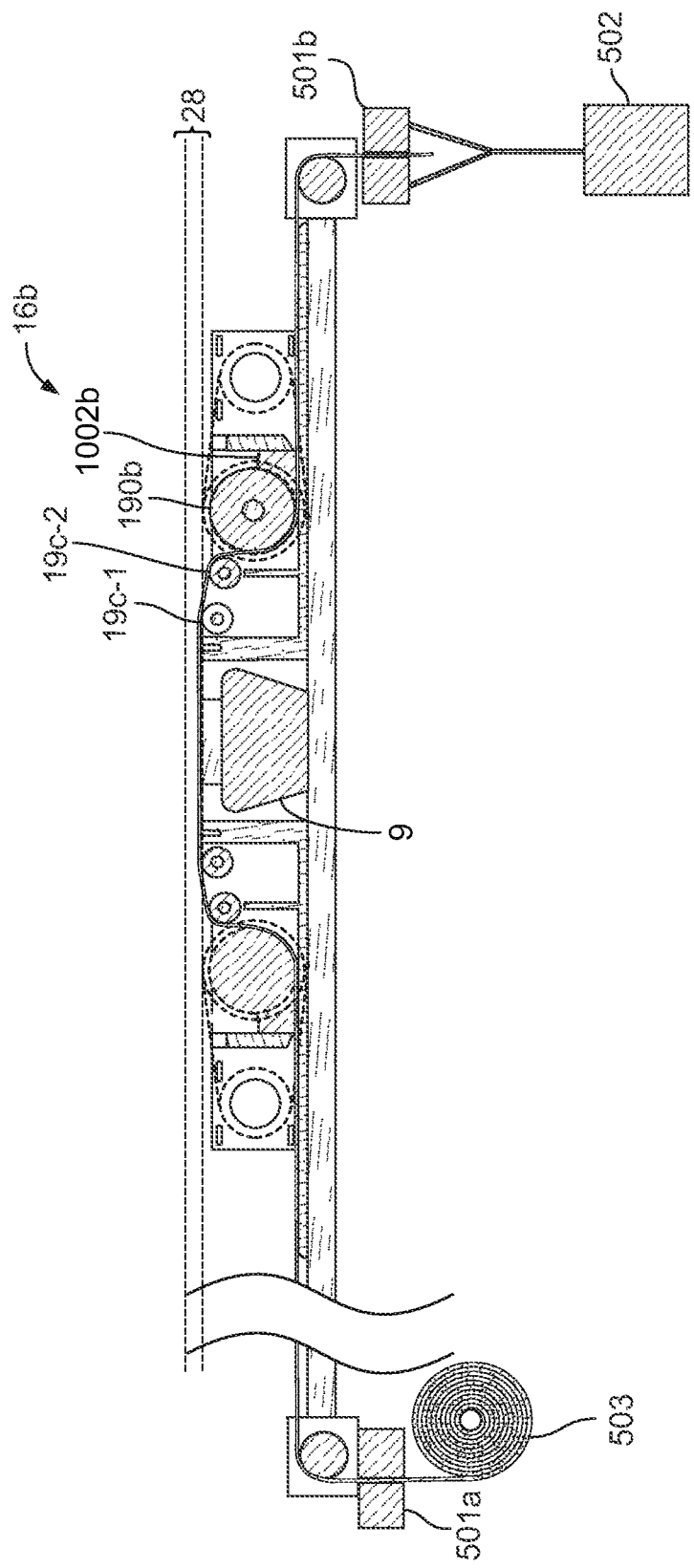
FIG. 2 is a cross sectional view taken along line A of FIG. 1.

Aspects of the invention can be applied in a new additive fabrication system and process that utilizes a foil to carry build material to an object build area and peel the foil from the newly hardened layer. This system and process and multiple embodiments thereof are described in PCT/NL2009/050783 and U.S. patent application Ser. No. 13/166,674 which are incorporated by reference in their entirety as if fully set forth herein. Referring to FIGS. 1 and 2, in one embodiment, the system can include a foil 6 for transporting build material, a plate 15 for holding an object in an object building area 28, a moveable reservoir 16b containing volume of build material 1002b, an applicator roller 190b for applying a layer of build material to the foil, guide rollers 19c-1 and 19c-2 for guiding the foil, and an exposure unit 9 for exposing the layer of build material to radiation to harden the layer. In one embodiment, tension may be applied to the foil by, for example, clamps 501a and 501b positioned on either end of the foil 6. In one embodiment, weights 502 are secured to at least one clamp 501b to keep the length of foil 6 under tension. The force of the weight 502 pulls the foil 6 taught and maintains tension along the length of the foil between the clamps 501a and 501b and during operation of the system.

Referring to FIGS. 3A-3E, an example of various states of an example embodiment is shown. Referring to FIG. 3A, the building of a layer of object 5 may begin by positioning a previously hardened layer 4' of object 5 in the object build area 28 and out of contact with the foil 6. Moveable reservoir 16b can be positioned in first position 41, where a portion 24 of the foil forms one of the containment surfaces of the containment area for containing a volume of build material 1002b. In addition, in position 41, as shown in FIG. 3A, the portion 24 is outside of the object build area 28.

Referring to FIG. 3B, the moveable reservoir 16b and exposure unit 9 have begun moving from left to right across the foil 6. Movement of the moveable reservoir 16b from left to right causes the applicator roller 190b to apply a substantially uniform layer of build material 10 to the carrying surface of the foil 6 and causes the upper rollers 19c-1 and 19c-2 to guide the portion of the foil on which the layer was applied into the object building area 28. For example, as moveable reservoir 16b continues movement to the right of position 41, toward second position 42, the applicator roller 190b moves across the portion 24. As the applicator roller 190b moves across the portion 24, it draws build material from the volume of build material 1002b and applies a layer of build material 10 onto the portion 24. Also, as the moveable reservoir 16b continues movement to the right, the upper rollers 19c-1 and 19c-2 lift the portion 24 to position the portion 24 and the layer of build material 10 on the portion 24 into the object building area 28. When the moveable reservoir 16b reaches position 42, as shown in FIG. 3B, the portion 24 is positioned in the object build area 28 and the layer of build material 10 on the portion 24 contacts the object 5. Referring to FIG. 3C, the moveable reservoir 16b and exposure unit 9 will continue movement to the right until the portion of the layer 10 to be exposed is exposed and thereby form the newly hardened layer 10' of the object 5.

Referring to FIGS. 3D and 3E, the moveable reservoir 16b is moved from right to left to perform the peeling function, which is the separation of the newly hardened layer and the foil. Any mechanical assembly or mechanism arranged or operated to achieve the separation of the newly hardened layer and the foil can be referred to as a separator. The upper roller 19c-1 guides the foil to peel the foil 6 from the newly hardened layer 10', removing from the object building area portions of the layer of build material that were not exposed, and positioning the foil outside of the object build area. For example, referring to FIG. 3D, moveable reservoir 16b is in position 42, where the portion 24 of the carrying surface is in the object building area 28 and is in contact with the newly hardened layer 10' of the layer of build material that was exposed by the exposure unit 9 to form the next layer of object 5. Referring to FIGS. 3D and 3E, as moveable reservoir 16b continues movement toward the left, toward first position 41, the upper roller 19c-1 moves across the portion 24, while engaging the underside of the foil 6. As the upper roller 19c-1 moves across the portion 24, it peels the portion 24 of the carrying surface from the newly hardened layer 10' and removes from the object build area 28 the portion 24 and portions of the layer of build material on the carrying surface that were not exposed to radiation. When the moveable reservoir 16b reaches position 41, shown in FIG. 3E, the portion 24 is outside the object build area 28 and forms one of the containment surfaces of the containment area for containing volume of build material 1002b.

Figure 4:
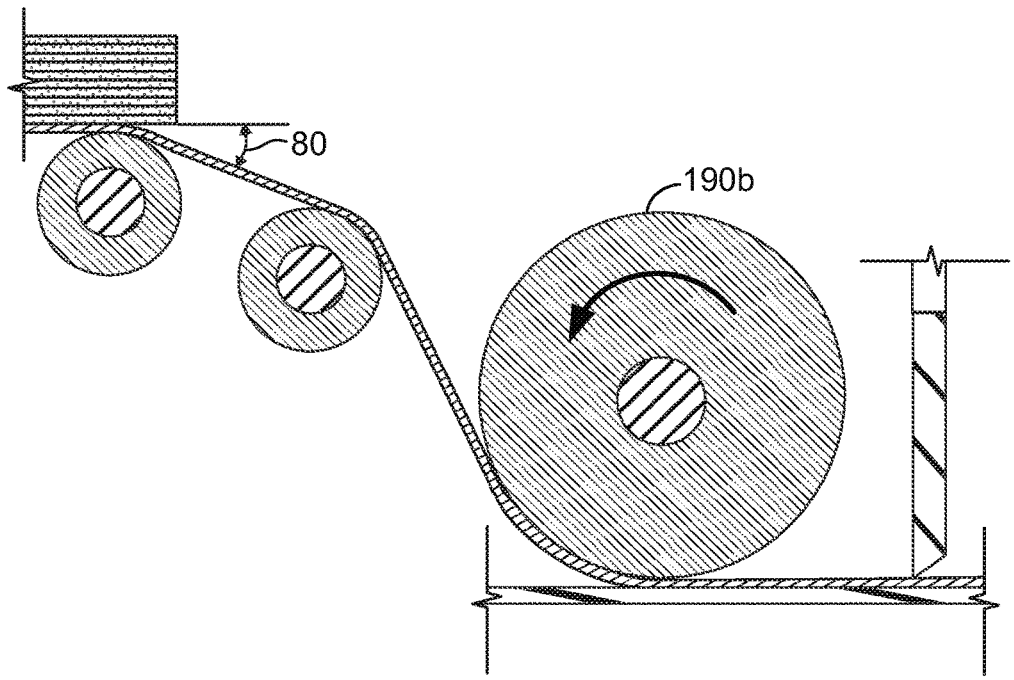
FIG. 4 is a cross sectional view of an embodiment of the current invention during operation.

In regard to the peeling function described above and referring to FIG. 4, in one embodiment, the foil 6 can be peeled from a newly hardened layer 10' using rollers 19c-1 and 19c-2 and tension applied to the foil 6. In FIG. 4, the rollers 19c-1 and 19c-2, travel from right to left while the foil 6 is under tension to maintain the foil taught against the rollers. The two rollers—a first roller 19c-1 and a second roller 19c-2—are used to position the foil 6 at an angle in relation to the newly hardened layer 10' of the object 5 to form a peel angle 80. As the rollers are moved from right to left, the foil is peeled from the newly hardened layer at the angle of the peel angle 80.

Use of a peel angle 80, as shown in FIG. 4, helps prevent the newly hardened layer from being separated from the previously formed layer during peeling by more evenly distributing the pull (z-direction) and shear (x-direction) components of the peeling force. Prior art peeling systems such as those disclosed in the '552 and '887 patents are configured to apply predominantly z-component peeling force to peel foil from the newly hardened layer, which thereby concentrates the pull force applied to the newly hardened layer and increases the chances of separating the newly hardened layer form the previously hardened layer or separating the previously hardened layers from one another. Distributing the peeling more evenly between the pull and shear components by use of a peel angle 80 reduces the chances of separating the newly hardened layer from the previously hardened layer.

The peel angle can be adjusted and then fixed for the entire building of the object or variable during the building of the object. The peeling angle can be varied within a single layer or varied such that one layer is built at a first peeling angle and a second layer is built at a second peeling angle. In one embodiment, the peel angle 80 can be fixed by maintaining the first roller 19c-1 and second roller 19c-2 in fixed positions. In such embodiments, the peel angle can remain constant as the foil 6 is peeled from the newly hardened layer 10'.

Figure 5:
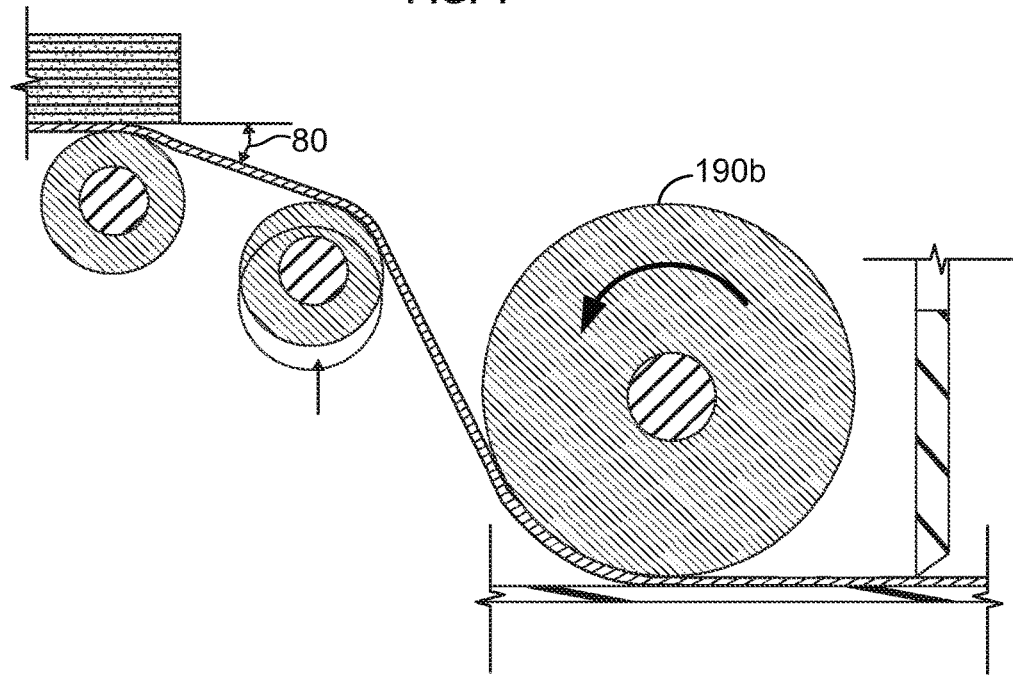
FIG. 5 is a cross sectional view of an embodiment of the current invention during operation.

In an embodiment, the peel angle 80 can be adjusted by using a foil orientation adjustment device. Referring to FIG. 5, in one embodiment, there is a foil orientation adjustment device such that the second roller 19c-2 is adjustable so that the peeling angle can be increased by lowering the second roller and decreased by raising the second roller.

Figure 6A:
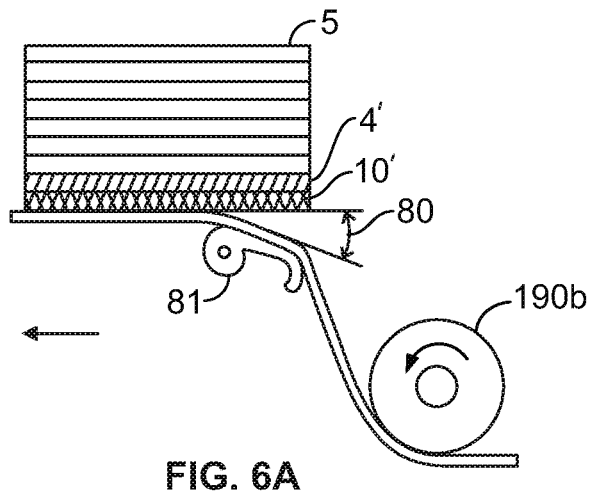
FIGS. 6A through 6C are cross sectional views depicting various states of an embodiment of the current invention during operation.
Figure 6B:
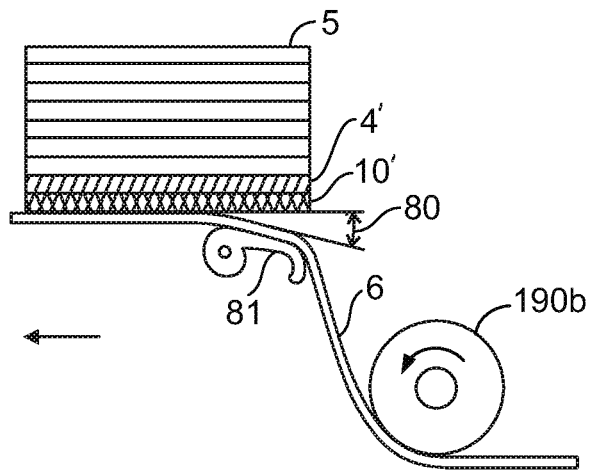
Figure 6C:
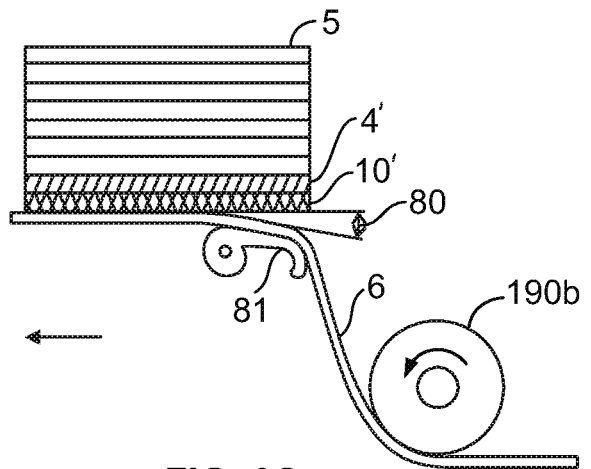

In addition, referring to FIGS. 6A-6C, in one embodiment, the foil orientation adjustment device can be a guide 81. The guide 81 can be used to establish and adjust (increase or decrease) the peel angle 80. Increasing the peeling angle increases the z-component of the peeling force while decreasing the peeling angle decreases the z-component. One example benefit of a system with an adjustable peeling angle is that the pulling force can be varied during the building of an object. For example, a greater peeling angle can be used on the first layer of an object to determine whether the first layer is adequately adhered to the plate 15 and then reduced for subsequent layers to prevent the separation of the newly hardened layers form the previously hardened layers. In addition, for example, in one embodiment, the peel angle can be adjusted during the peeling of a newly hardened layer so as to vary the pulling component of the peeling force during peeling of such layer.

In an embodiment, a foil orientation adjustment device that adjusts the peeling radius can be adjusted as opposed to a peeling angle. By a peeling radius it is meant a surface possessing a curvature, such as a circular or otherwise curved surface, as opposed to a substantially flat surface that may be used in a fixed angle peel. For instance, in an embodiment a roller of appropriate diameter is used as a peeling roller. In an embodiment, the peeling radius is adjusted by using a curved guide. The curved guide is adjustable such that the peeling radius of the curved guide can be increased (less curvature) or decreased (greater curvature) depending on the desired peeling radius.

In an embodiment, a foil orientation adjustment device can comprise a computer readable medium containing program instructions for specifying the peel angle, that when executed direct the peel angle to be adjusted in accordance with aspects of this disclosure. In an embodiment, the foil adjustment device may include a computer device including a memory storing program instructions for adjusting the peel angle and a processor for executing such program instructions in accordance with aspects of this disclosure. In an embodiment, the foil orientation adjustment device may comprise the aforementioned computer device directing rollers and/or guides to adjust the peel angle.

In an embodiment, program instruction may be stored on any computer readable medium. Computer readable medium as used herein may be any available media, both tangible and intangible, that may be accessed by a computer device and include both volatile and nonvolatile media, and removable and non-removable media. By way of example, and not limitation, computer readable media may comprise a combination of computer storage media and communication media. Computer storage media include volatile and non-volatile, removable and non-removable media implemented in any method or technology for storage of information such as computer readable instructions, object code, data structures, program modules or other data. Computer storage media include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computer device. Such computer may operate in a networked environment supporting connections to one or more computer devices and/or computer readable medium. Program instructions when executed will direct a processor to take certain steps or actions consistent with the instructions.

In one embodiment, the object can be oriented to initiate the peel at an area of the object which results in an improved peeling force applied to the newly hardened layer over alternative object orientations. For example, referring to FIGS. 7A through 7C, an object 82 is oriented to be built so that the peeling of the foil from the newly hardened layer is initiated at a corner 83 of the object 82 rather than its side 84.

Referring to FIG. 7A, in an embodiment, the process begins by assessing the geometry of an object 82 to be built in a pre-build assessment. As used in this patent application, a pre-build assessment includes assessments made before building begins, during building, or after the building of one individual layer but before the building of another individual layer. A pre-build assessment may consider the object geometry as a whole, i.e. all of the layers together, a portion of the object geometry, i.e. more than one but less than all layers, or the geometry of layers individually. In further embodiments, the pre-build assessment may consider other factors, such as the temperature of the object being produced, the weight of the object, the number of layers previous or subsequent to a certain layer, or the geometry of previous or subsequent cross-sections.

The pre-build assessment is used to determine the parameters of the additive fabrication process that results in the highest likelihood of success in building the object. In embodiments, the pre-build assessment may optimize the additive fabrication process to achieve the lowest likelihood of separating the newly hardened layer from the previously hardened layer, the previously hardened layers from one another, or a previously hardened layer with the plate holding the object. In an embodiment, the pre-build assessment is optimized to achieve the highest likelihood of separating the newly hardened layer from the foil.

In embodiments, the pre-build assessment may also consider the type and properties of the build material or an object made therefrom. For instance, depending on the type and properties of the build material and/or an object made therefrom, and the geometry of the desired object, it may be more desirable to allow a high peeling force on an early layer of the object in favor of achieving lesser peeling forces on later layers due to, for example, the additional weight of the object being suspended from the plate. In addition, for example, different build materials may have different peeling properties, degrees of adhesion to the foil or to a previously hardened layer, or other properties that may result in an improved peeling force being obtained at a first object orientation if the object was built with a first build material and an improved peeling force being obtained at a different object orientation if the object was built with a different build material. In an embodiment, the apparatus comprises an object orientation adjustment controller. The object orientation adjustment controller is arranged to adjust the in-plane orientation of the object and/or the separator. By in-plane it is meant that the newly hardened layer and the surface of the foil remain substantially parallel.

In FIG. 7A, the object 82 to be built is first shown in dotted-line format to represent the orientation of the object before the pre-build assessment of the geometry of the object. If the object were to be oriented so that the peel would initiate from the side 84 of the object, the initial peeling force applied to the object may be greater than if the peel were to initiate at the corner 83 of the object 82 because the side 84 has greater surface area than the corner 83. A greater amount of peeling force may be required to overcome the adhering force between the foil and the newly hardened layer at the side 84 rather than the corner 83 because there is a greater surface area of foil adhered to newly hardened layer at the side 84 rather than the corner 83. Initiation of the peel at the corner 83, which has a small surface area, may therefore result in a lower initial peeling force applied to the newly hardened layer than if the peeling were to initiate from the side 84 of the object 82. Initiating the peel from the corner 83 also allows for the peeling force applied to the newly hardened layer to increase gradually as the peel progresses. Accordingly, in the example shown in FIG. 7A, the pre-build assessment of the geometry of the object 82 determines that a lower initial peeling force would result if the object 82 were oriented and built so that the peel were to initiate at the corner 83. In an embodiment, the object orientation adjustment controller then causes the object to be built in the orientation determined in the pre-build assessment, as shown in FIGS. 7A through 7C.

In one embodiment an average initial peeling force can be determined during the pre-build assessment by averaging the initial peeling force for each layer of the object at various orientations. The average initial peeling force can be calculated relative to the other layers in the object rather than calculating a specific peeling force for each layer. The object can then be built at an orientation which results in the least average initial peeling force applied to the newly hardened layers throughout the build.

In another embodiment a maximum peeling force can be determined during the pre-build assessment for each layer. In some cases, the maximum peeling force that will occur during the entire building of the object may result in the greatest risk of build failure and thus reducing the maximum peeling force will result in an improved peeling force over alternative object orientations. The object can then be positioned and built at an object orientation that results in the least possible maximum peeling force.

In one embodiment, the object orientation is determined to be the orientation that results in the lowest maximum peeling force across all layers of the object. In other embodiments, the object orientation is determined to be the orientation that results in the least average peeling force for the object. In further embodiments, the object orientation is determined to be the orientation that results in the least average initial peeling force for the object. In a further embodiment, the object orientation is determined to be the orientation that results in the greatest initial peeling force in combination with the lowest maximum peeling force for the object.

Referring again to FIG. 7A, in an embodiment, the relative peeling force for a layer is simply calculated by determining the amount of the cross-section that will pass over the first roller 19c-1. For instance, for object 82, the amount of the cross-section that will pass over the first roller 19c-1 is less at the corner 83 of the object 82 than at the center of the side 84 of the object 82 when the object is positioned at a certain object orientation. In an embodiment, the object orientation adjustment controller adjusts the object orientation, resulting in a rotation of the object from the orientation of the object before the pre-build assessment in the building plane. In an embodiment, the object orientation adjustment controller comprises a computer readable medium containing program instructions for specifying the orientation of the object, that when executed, among other things, direct the in-plane orientation between the object and the separator to be adjusted. In an embodiment, the object orientation adjustment controller comprises a computer device including a memory storing program instructions for specifying orientation of the object and a processor for executing the program instructions in accordance with aspects of this disclosure. In an embodiment, the object orientation adjustment controller may comprise the aforementioned computer device directing a rotator connected to the plate and/or a separator to adjust the in-plane orientation between the object and the separator.

In one embodiment, the object orientation adjustment controller is arranged to adjust the angle of the separator. For instance, the first roller 19c-1 can be angled relative to the direction of the peel so as to permit the foil to be peeled at an angle relative to the direction of travel. For example, referring to FIGS. 8A through 8F, the direction of the peel is from left to right. The peel for the first object 82 initiates at the corner 83 of the object 82 as described above with regard to FIGS. 7A through 7C. Referring to FIG. 8D, one end of the first roller 19c-1 is extended so as to position the first roller at an angle relative to the direction of the peel. The first roller 19c-1 in FIG. 8D can also be referred to as being positioned transverse to the direction of the peel. This allows the peel for the second object 85 to initiate at the corner 83. The first roller 19c-1 can return to its initial position once the peel is complete, as shown in FIG. 8F.

In an embodiment, the first roller 19c-1 can be a flexible guide roller as described in EP10189599.3 (now published as EP2447044), which is hereby incorporated by reference as if fully set forth herein. The flexible guide roller may comprise a flexible roller shaft such that the curvature of the flexible guide roller is completely reversible. Furthermore, a bearing system may be present that is capable of engaging the flexible guide roller in order to modify the curvature of the flexible guide roller. Use of a curved roller can also allow the foil to be peeled at an angle relative to the direction of travel. For example, referring to FIG. 8D, if first roller 19c-1 were curved (not shown) toward object 85, the center of the roller would initiate the peel at the center of the side 87. As the peel continued, the roller would contact the portion of the side between the center and the corner 86 at an angle relative to the direction of the peel (or transverse to the direction of the peel).

Figure 9A:
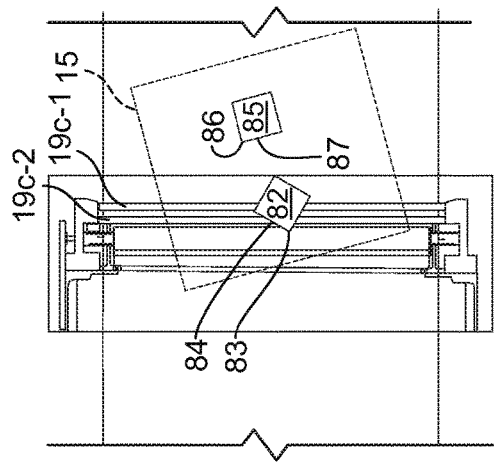
FIGS. 9A through 9F are top views depicting various states of an embodiment of the current invention during operation.
Figure 9D:
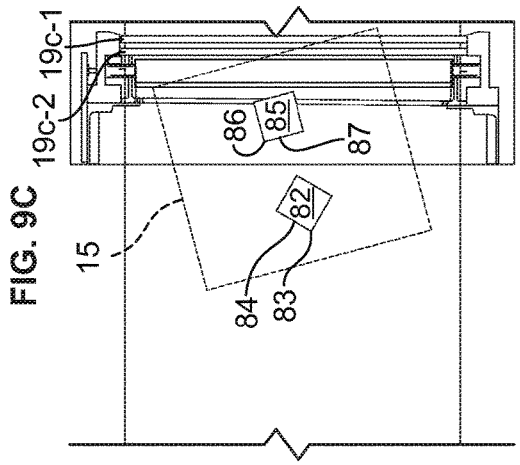
Figure 9B:
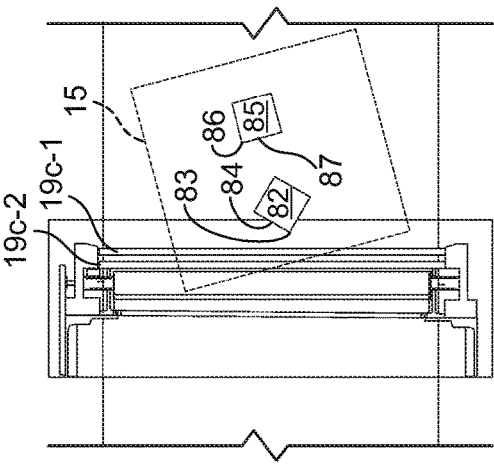
Figure 9E:
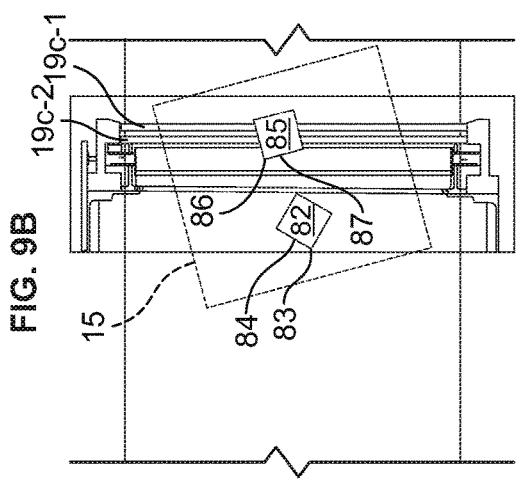
Figure 9C:
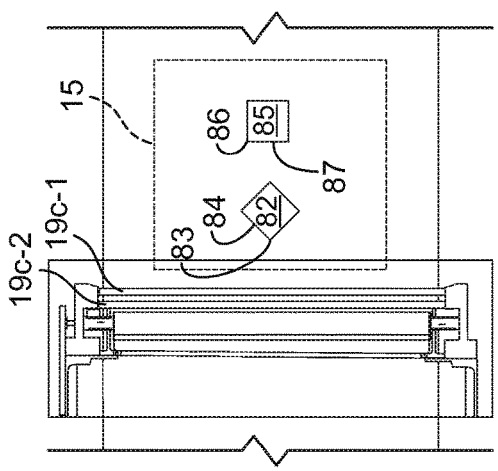
Figure 9F:
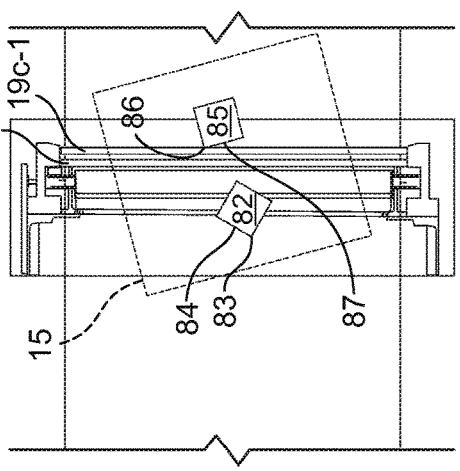

In an embodiment, an object orientation adjustment controller is arranged to adjust the in-plane rotation of the plate, and thereby the object, and/or the separator. In an embodiment, the plate can be positioned at an angle relative to the direction of the peel so as to orient the object to result in a lesser initial peeling force applied to the newly hardened layer. For example, referring to FIGS. 9A through 9F, the direction of the peel is from left to right. In FIG. 9A, the plate 15 is positioned parallel to the direction of peel. If the peel were to be completed while the plate 15 is in the position shown in FIG. 6A, the peel of the second object 85 would initiate at its side 87. Accordingly, the plate 15 can be positioned at an angle relative to the direction of the peel so that the peel for object 85 initiates at its corner 86, as shown in FIG. 9D.

In addition, an average initial peeling force can be determined during a pre-build assessment of the geometries of the objects to be built by averaging the initial peeling force for each layer of the objects at various orientations determined by various positions of the plate 15. For example, in FIGS. 9B through 9F, a pre-build assessment can determine that the least average peeling force would be applied to objects 82 and 85 under the position of the plate shown in FIGS. 9B through 9F.

In a further embodiment, a different object orientation for each layer may be calculated in the pre-build assessment. The plate can then be rotated after the completion of a first hardened layer and before the start of the building of a second hardened layer such that an improved peeling force is attained for each layer over alternative object orientations. For instance, the difference in geometries of the first hardened layer and the second hardened layer may allow an improved peeling force to be achieved for the second hardened layer at a different object orientation than if the second hardened layer is formed at the object orientation used to build the first hardened layer. In an embodiment, the plate can be rotated during the building of an individual layer to thereby adjust the object orientation during the building of the layer.

Building detached elements of an object of acute detail, so-called fine features, has been observed to be more challenging in additive fabrication processes that utilize a foil vs. traditional additive fabrication processes that do not utilize a foil. Small features can generally be described as detached locations of small surface area in the layer being formed. The features must be detached rather than connected to areas of larger surface area. An area of acute detail is not considered a fine feature if the detail is connected to a feature of larger surface area.

Moreover, the smallest dimension of the feature may define whether the feature is a fine feature or not. For instance, a detached feature that is 5 mm×5 mm may not be a fine feature, whereas a detached feature that is 1 mm×25 mm may be a fine feature. The characteristics of the additive fabrication process, such as the resolution, the radiation intensity, and/or the build material, may affect whether a feature can be classified as a fine feature for the given process. The added difficulties in building a fine feature in additive fabrication processes that utilize a foil vs. traditional additive fabrication processes that do not utilize a foil is believed to be the result of the added stresses imposed on the newly hardened layer in additive fabrications processes that utilize a foil.

In embodiments, the additive fabrication apparatus is configured to alter the amount of time between the exposure of the build material to radiation and the initiation of the peel within an individual layer based on the geometry of the layer being formed. As used in this patent application, the separation time is the time interval from exposure of at least a portion of build material, thus forming a newly hardened layer, to the time the foil is peeled from the portion of the newly hardened layer. The separation time may, for example, be dependent on the geometry being formed or the curing behavior of the build material.

For example, referring to FIG. 10A, the object being built possesses two regions of distinct geometry, region 200 and region 201. Region 200 contains a feature with a relatively large cross-sectional area, whereas region 201 contains several fine features.

The additive fabrication apparatus in FIG. 10A-E can be described as having three general stages. Applicator stage 210 is the leading stage which, when operated in the direction of travel, applies build material 1002b to foil 6. Imaging stage 220 solidifies the layer of build material. Separating stage 230 is the trailing stage which, when operated in the direction of travel, separates the newly hardened layer and the foil 6. The distance between the imaging stage 220 and the separating location 231 of the separating stage 230 can be referred to as the first separation distance 240. The separation time is thus the time interval beginning when a portion of the layer of build material is imaged by imaging stage 220 and ending when the foil is separated from the portion of the newly hardened layer by separating stage 230. All three stages have begun to move to the right in FIG. 10A.

Referring now to FIG. 10B, the first separation distance 240 has been maintained and a newly hardened layer 10' has been formed in region 200. In order to allow for additional solidification of the newly hardened layer in region 201 before separation, separating stage 230 stops or slows down while the applicator stage 210 and imaging stage 220 continue moving.

Referring to FIG. 10C, the separation distance has been extended to form second separation distance 241. The separation time has thus been increased. Separating stage 230 now begins to move again. Separation stage 230 may also proceed through region 201 at a slower speed than separation stage 230 moved through region 200.

Although not shown, the dose of light delivered by imaging stage 220 in region 201 may also be increased by increasing the intensity or dose of the radiation supplied or by decreasing the speed of the imaging stage 220 through zone 201. Furthermore, the dose of radiation may be controlled to provide different doses to different regions of the geometry. For example, the dose or intensity may be adjusted to be larger around the borders of the geometry than in the center of the geometry.

Referring now to FIGS. 10D and 10E, the imaging process is completed with separating stage 230 separating the foil and the newly hardened layer 10' in region 201. The process may then be completed in reverse to form additional newly hardened layers.

In contrast to building fine features, larger features may require a shorter separation time since a larger separation time may yield excessive adhesion to the foil. Furthermore, the duration of the additive fabrication process is dependent on separation time. Keeping the separation time as short as possible improves the overall speed of the additive fabrication process as an object can be made in less time.

Figure 11:
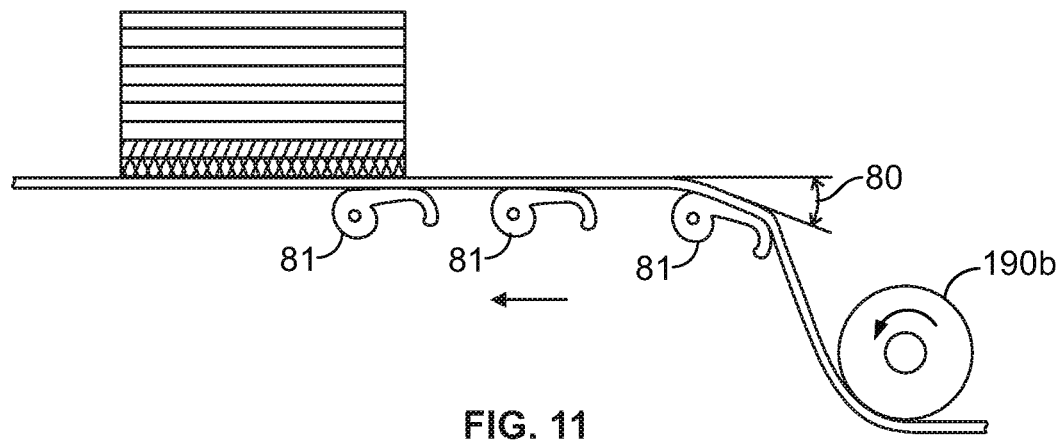
FIG. 11 is a cross sectional view of an embodiment of the current invention during operation.

In an embodiment, the separation time can be adjusted by a separator that comprises a series of foil orientation adjustment devices. Referring now to FIG. 11, depending on the desired separation time, any of foil orientation adjustment devices 81 could be oriented to create the desired separation time and further adjusted to create and/or modify a peel angle 80. Furthermore, a different foil orientation adjustment device can be activated at different locations within the building of an individual layer to thereby provide differing separation delays for different locations within the same layer. The foil orientation adjustment devices additionally may be vertically movable (not shown) to create the requisite separation time.

In an embodiment, multiple rows of foil orientation adjustment devices are present such that the separation time can be controlled for different areas of the same layer. In an embodiment, the apparatus may comprise, for instance, five rows of foil orientation adjustment devices, each row having three foil orientation adjustment devices each.

Figure 12:
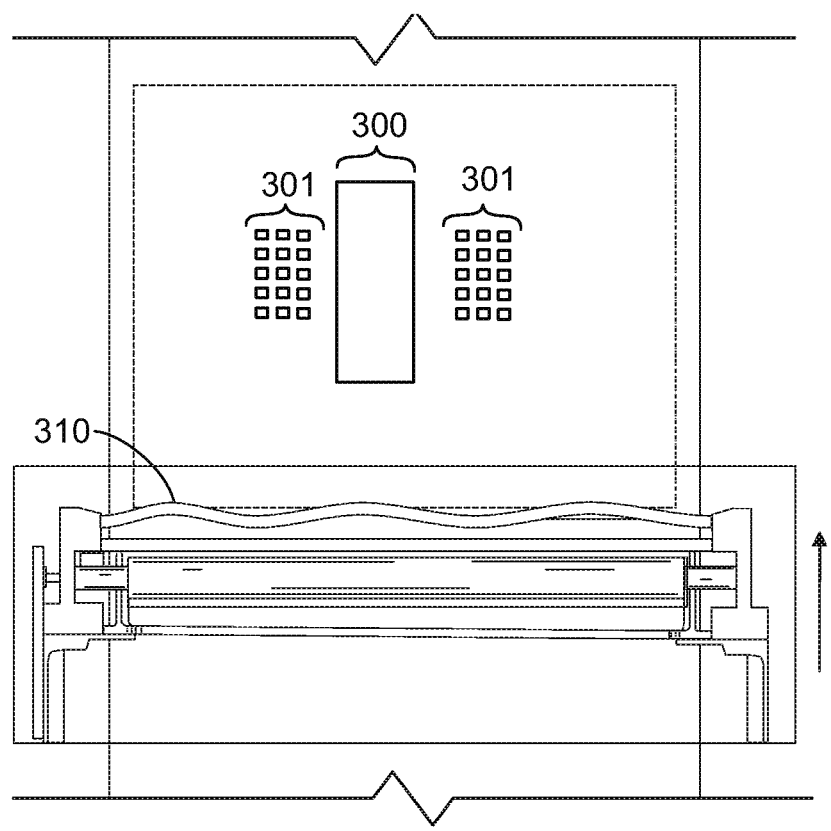
FIG. 12 is a top view depicting an embodiment of the current invention during operation.

In an embodiment, the separation time is controlled for different areas of the same layer by a separator comprising a roller of variable curvature. Referring now to FIG. 12, the object cross-section contains two separate areas. Region 300 is an area of normal feature size whereas regions 301 are regions containing fine features. In order to increase the separation time through region 301, roller 310 is flexed such that the peel occurs at a later time for region 301 than in region 300. In an embodiment, the roller is flexed using a plurality of bearing elements such as for example as disclosed in EP2447044. In an embodiment, the bearing elements are translatable over some length of the roller to provide for accurate positioning of the roller curvature.

The separation time may also be adjusted, for example, based on the position of an individual layer in the object being formed (inter-layer). For instance, depending on the size of the object being created, the curing of build material may create a significant amount of heat that may make separation of the newly hardened layer from the foil more difficult. The amount of heat increases as the object is formed. The heat buildup is dependent on the characteristics of the previous layers formed, for instance, if the previous layers are large and/or connected, as opposed to small or detached. By increasing the separation time in a layer based on the characteristics of the previous layers formed, such as based on the position of the layer being formed within the overall object, the geometry of the previous layers, and/or based on the measured or estimated temperature of the object, it is possible to better dissipate this heat before separating the newly hardened layer from the foil.

In an embodiment, the separation time is adjusted based on the characteristics of layers previous or subsequent to the current layer being formed. In embodiments, these characteristics include, the measured or estimated temperature of the object, the current weight or anticipated total weight of the object, the number of layers previous or subsequent to the layer being formed, and/or the geometry of layers previous or subsequent to the layer being formed.

In an embodiment, a separation time controller is arranged to adjust a separation time in accordance with aspects of this disclosure. In an embodiment, the separation time controller comprises a computer readable medium containing program instructions for specifying a separation time, that when executed direct the apparatus, by for example directing the stages, to adjust the separation time in accordance with aspects of this disclosure. In an embodiment, the separation time controller comprises a computer device including a memory storing program instructions for specifying a separation time and a processor for executing the program instructions in accordance with aspects of this disclosure. In an embodiment, the separation time controller may comprise the aforementioned computer device directing the apparatus, by for example directing the stages, to adjust separation time in accordance with aspects of this disclosure.

In an embodiment, a pre-build assessment of an object is performed to determine the object orientation, peel angle, the separation time, or any combination of the three based on the geometry of the object. In an embodiment, the object orientation, peel angle, or the separation time, or any combination of the three, are adjustable during the building of an individual layer of the object.

The detailed drawings, specific examples and particular embodiments given serve the purpose of illustration only. While the specific embodiments of the systems and methods described and shown herein concern building an object upside down, the teachings of the present invention may be applied to apparatuses that build objects right side up or at an angle. In the foregoing specification, the invention has been described with reference to specific examples of embodiments of the invention. It will, however, be evident that various modifications and changes may be made therein without departing from the broader spirit and scope of the invention as set forth in the appended claims. Furthermore, the object may have any suitable size and shape. Furthermore, the devices may be physically distributed over a number of apparatuses, while functionally operating as a single device. Also, devices functionally forming separate devices may be integrated in a single physical device. However, other modifications, variations and alternatives are also possible. The specifications and drawings are, accordingly, to be regarded in an illustrative rather than in a restrictive sense. While certain embodiments detail certain optional features as further aspects of the invention, the description is meant to encompass and specifically disclose all combinations of these features unless specifically indicated otherwise or physically impossible.

What is claimed is:

1. A method for additive fabrication where a foil is peeled from a newly hardened layer of build material comprising steps of: performing a pre-build assessment of an object comprising determining an object orientation that will result in a peeling force applied to a newly hardened layer of the object during a building of the object, and determining a separation time of the object to be formed; and building the object, the object being positioned at the object orientation, from a plurality of individual layers formed by performing steps comprising coating a build material onto a foil and irradiating the build material; wherein the separation time is adjustable by a separator that comprises a series of foil orientation adjustment devices, wherein the foil orientation adjustment devices are independently operable to adjust a peel angle and are configured to provide differing separation delays along different locations within an individual layer; wherein the separation time is adjustable by a separator that comprises a series of foil orientation adjustment devices, wherein each of the foil orientation adjustment devices is independently operable to create or adjust a peel angle, such that when a first foil orientation adjustment device creates or adjusts a peel angle, a second foil orientation adjustment device is capable of simultaneously not being operated such that no peel angle is created, and wherein each of the foil orientation adjustment devices is configured to provide differing separation delays along different locations within an individual layer.

2. The method of claim 1 wherein the object orientation is the orientation of the object that is calculated to most likely result in successful building of the object.

3. The method of claim 1 wherein the object orientation is calculated to result in an initial peeling force for at least one layer.

4. The method of claim 1 wherein the object orientation comprises a rotation of the object.

5. The method of claim 4, wherein the rotation of the object is a rotation of the object in a building plane.

6. The method of claim 1, further comprising a step of determining an average initial peeling force during the pre-build assessment.

7. The method of claim 6 wherein the step of determining an average initial peeling force during the pre-build assessment comprises averaging the initial peeling force for each layer of the object at more than one orientation.

8. The method of claim 6 wherein the object is built in the object orientation which results in the least average initial peeling force applied to the newly hardened layers throughout the build.

9. The method of claim 1, further comprising determining an object orientation corresponding to each of the plurality of layers of the object.

10. The method of claim 1 further comprising a step of altering the object orientation at least once during the building of the object.

11. The method of claim 1 wherein the object orientation is altered during the building of at least one individual layer.

12. The method of claim 11 wherein the object orientation is altered by rotating a plate arranged for holding the object.

13. The method of claim 1, wherein the foil orientation adjustment devices are configured to activate at different locations within the building of an individual layer.

14. The method of claim 1, wherein the foil orientation adjustment devices are configured to be vertically moveable.

15. The method of claim 1, further comprising multiple rows of foil orientation devices.

16. The method of claim 15, further comprising five rows of foil orientation adjustment devices, wherein each of the five rows comprises three foil orientation adjustment devices.

17. The method of claim 1, wherein the separator comprises a roller of variable curvature.

18. The method of claim 1, wherein the separation time is adjusted based on a characteristic of a layer previous or a layer subsequent to the newly hardened layer.

19. The method of claim 18, wherein the characteristic comprises a measured temperature or an estimated temperature of the object.

20. The method of claim 18, wherein the characteristic comprises a current weight or an anticipated total weight of the object, a number of layers previous or layers subsequent to the newly hardened layer, or a geometry of layers previous or layers subsequent to the newly hardened layer.

* * * * *